3,099,641
POLYAMIDE-POLYAMINE SYNTHETIC RESINS FROM DIKETENE AND A DIAMINE

John R. Caldwell and James C. Martin, Kingsport, Tenn., assignors to Eastman Kodak Company, Rochester, N.Y., a corporation of New Jersey
No Drawing. Filed May 15, 1958, Ser. No. 735,359
16 Claims. (Cl. 260—65)

This invention relates to highly polymeric polyamide-polyamine synthetic resins and to a process for their preparation involving the condensation of diketene with a substantially equal molecular proportion of a diamine and to the hydrogenated and cross-linked derivatives. This invention also relates to various end products utilizing these polyamide-polyamine synthetic resins such as photographic elements, constituents for antifouling marine paints, insecticides, fungicides, pigments for synthetic fibers, dye assistants, coating compositions for fabrics, etc.

The prior art contains disclosures concerning the reaction of diketene with diamines to produce condensation products which are not highly polymeric, synthetic, film-forming resins. Such products described in the prior art include monoacetoacetamides and bis(acetoacetamides). Moreover, the prior art does not contemplate the valuable end products which can be produced in accordance with the disclosures herein.

It is an object of this invention to provide film-forming, highly polymeric, linear polyamide-polyamines containing unsaturated linkages between the recurring units in the polymer. It is a further object of this invention to provide polyamide-polyamines wherein the unsaturated linkages have been hydrogenated. Another object of the invention is to provide cross-linked polyamide-polyamines by treating the linear polymers with formaldehyde or an organic compound which forms formaldehyde.

It is a further object of this invention to provide processes for preparing the various polyamide-polyamines encompassed within the scope of this invention.

It is an additional object of this invention to provide anti-static photographic film comprising a support coated on one side with a cross-linked polyamide-polyamine.

It is a further object of this invention to provide coating compositions for fabrics whereby the coated fabric has reduced tendency toward acquiring a static electrical charge.

It is an additional object of this invention to provide polyamide-polyamine compositions which can be added to a dope containing a fiber-forming polymer and spun to form fibers which have greatly improved dyeability with premetallized dyes and other dyes such as acid wool dyes, cellulose acetate dyes, direct cotton dyes, etc.

It is another object of this invention to provide polyamide-polyamines to which can be added antihalation dyes and coated from solution onto photographic supports whereby the coating is readily removable from the photographic support in the fixing bath because it is soluble in acid solutions.

It is a further object to provide metallized polyamide-polyamines in the form of coordination compounds with metals such as beryllium, divalent iron, divalent palladium, divalent manganese, copper, zinc, nickel, chromium, cobalt, calcium, strontium, barium, cadmium (i.e. metals in divalent state).

It is another object to provide copper-containing polyamide-polyamines which are useful as constituents in antifouling marine paints, insecticides, fungicides and the like.

Other objects of this invention are apparent elsewhere in this specification.

In accordance with a principal embodiment of this invention there is provided a film-forming highly polymeric linear polyamide-polyamine essentially composed of regularly recurring units selected from the group consisting of units having the following two formulas:

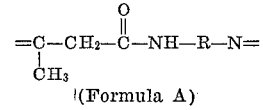

(Formula A)

and

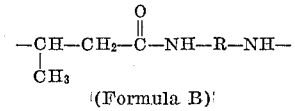

(Formula B)

where the ends of the polymer molecules have the terminal bonds on such units satisfied by hydrogen atoms and R represents a divalent organic radical containing from 2 to 20 carbon atoms.

More specifically it is advantageous when R as defined above is such that $NH_2-R-NH_2$ is a member selected from the group consisting of 1,6-hexamethylenediamine, p-xylene-$\alpha,\alpha'$-diamine, m-xylene-$\alpha,\alpha'$-diamine, 1,4-cyclohexanebis(methylamine), 1,3-cyclohexanebis(methylamine), 4,4'-methylenebisaniline and diethylenetriamine, or other position isomers of any of these compounds which are obvious equivalents.

One of the preferred embodiments of this invention provides a polyamide-polyamine wherein the repeating units have Formula A as defined above wherein $$NH_2-R-NH_2$$

is diethylenetriamine. This and other polyamide-polyamines as described above can be prepared in a cross-linked form wherein the cross-linkages are provided by formaldehyde.

A particular embodiment of the invention involving such cross-linked polyamide-polyamines constitutes a photographic element whereby there is provided an anti-static photographic film comprising a support composed of a highly polymeric, linear, condensation-type polyester such as polyethylene terephthalate which is coated on one side with a light sensitive photographic emulsion layer and on the opposite side with from 0.5 to 5% by weight of said support of a cross-linked polyamide-polyamine such as that mentioned in the preceding paragraph derived from diethylenetriamine. Analogous results can be obtained when the support is composed of polystyrene, cellulose acetate, cellulose acetate-butyrate, the polyurethanes produced by condensing a bis phenol with phosgene, etc.

Another embodiment of this invention also provides a process for preparing a film-forming, highly polymeric, linear polyamide-polyamine essentially composed of recurring units having the following formula:

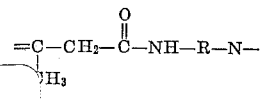

where the ends of the polymer molecules have the terminal bonds on such units satisfied by hydrogen atoms and R represents a divalent organic radical containing from 2 to 20 carbon atoms which comprises reacting at 0°–50° C. substantially equimolecular quantities of diketene and a diamine having the formula $NH_2$—R—$NH_2$.

Diketene as the term is used in this specification is a dimer of ketene possessing structure I

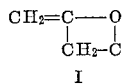 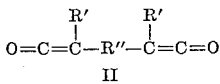

which structure I is entirely distinct from the bisketenes having structure II which will not produce polymers having recurring units as defined herein (R' is a monovalent atom or radical and R'' is a divalent radical).

The process as just described can be advantageously conducted in the presence of an inert solvent for the diketene, the diamine, and the polyamide-polyamine which is being produced. Such inert solvents can be selected from the group consisting of the following organic compounds containing from 1 to 15 carbon atoms: hydroxyalkoxyalkanes, dialkyl ethers, alkanols, dihydroxyalkanes, dioxane, dimethylformamide, diethylformamide, chloroalkanes, bromoalkanes and iodoalkanes.

According to a further embodiment of this invention there is provided a process for preparing a film-forming, highly polymeric, linear polyamide-polyamine essentially composed of recurring units having the following formula:

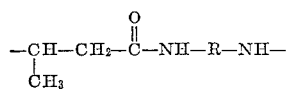

where the ends of the polymer molecules have the terminal bonds on such units satisfied by hydrogen atoms and R represents a divalent organic radical containing from 2 to 20 carbon atoms which comprises hydrogenating at 20°–150° C. a polymer as defined hereinabove having Formula A in a closed vessel under from 500 to 5000 p.s.i. of hydrogen in the presence of a hydrogenation catalyst.

The process just described can be advantageously accomplished using a hydrogenation catalyst selected from the group consisting of nickel, platinum, and palladium hydrogenation catalysts. Of course, other hydrogenation catalysts can also be employed since there is nothing critical as regards what catalyst is selected. The hydrogenation can be advantageously conducted in the presence of an inert solvent selected from the group of solvents listed hereinabove. Other equivalent solvents can be similarly employed.

According to an additional embodiment of this invention there is provided a process for preparing a crosslinked polyamide-polyamine comprising mixing (a) 100 parts by weight of a polyamide-polyamine as defined above, (b) from at least a sufficient amount of water to dissolve said polyamide-polyamine up to 10,000 parts by weight of water, and (c) formaldehyde or an organic compound which forms formaldehyde in contact with water in an amount sufficient to provide from 1 to 25 parts by weight of formaldehyde. Of course, the amount of water which can be used can be even greater than that specified although there is generally no purpose in using such larger quantities of water. Organic compounds which form formaldehyde in contact with water are well known in the art and there is nothing critical about which of such compounds is used. The process can be further facilitated by the presence of about 0.1 to 1 part by weight of ammonium chloride to each part by weight of formaldehyde which is used.

Further examples of what R can represent including some of the values for R given hereinabove include alkylene radicals, alkylene radicals interrupted by —O— or —N— atoms, arylene radicals,

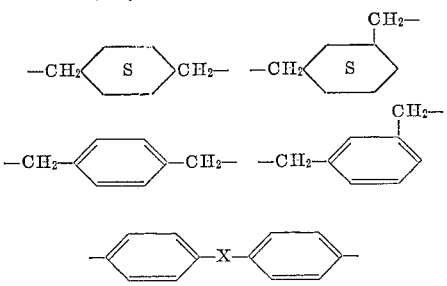

or

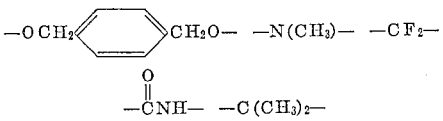

where X represents —$CH_2$—, —O—, —$CH_2$—$CH_2$—, —$CH(CH_3)CH_2$—, —$CH(CH_3)$—, —$OCH_2CH_2O$—, —$SO_2$—, —S—, —$OCH_2$⟨phenylene⟩$CH_2O$— —$N(CH_3)$— —$CF_2$—

—$\overset{O}{\overset{\|}{C}}NH$— —$C(CH_3)_2$— etc. In the above formulas the S appearing inside the hexagon represents the cyclohexylene radical which can also be designated as the saturated phenylene radical. It is apparent that the R radicals are composed of hydrogen and carbon atoms arranged so as to include a sequence of carbon atoms from one end of the R radical to the other end, said sequence containing no interrupting radicals other than radicals selected from the group consisting of —O—, —S—, —$SO_2$—, —NH— and

—$N(CH_3)$— radicals.

In carrying out the processes of this invention the diketene and diamine should be present in substantially equal molecular quantities. Polyamide-polyamine polymers can be obtained under optimum conditions having exceptionally high molecular weights for polymers of this type.

It has been found most advantageous to carry out the processes of this invention in a solvent that dissolves both reactants as well as the polymer. In some instances, where a polymer of relatively low molecular weight might be desired, the reaction medium need not be a solvent for the polymer. Advantageous solvents coming within the scope of those defined earlier hereinabove include, dioxane, diethyl ether, chloroform, propylene glycol, ethylene glycol, etc.

It has been unexpectedly discovered that water can also be used as a reaction medium despite the fact that water reacts with diketene. The reactivity of the diamine with diketene is so rapid that any side reaction with water has been found to be negligible.

The temperature for carrying out the reaction between diketene and diamine can be advantageously restricted to 15°–25° C. The temperature for conducting the hydrogenation process can advantageously be kept in the range of 50–100° C. in order to avoid possible hydrogenation of any aromatic groups which may be present.

The method of isolating the polymer from a solvent-containing reaction medium depends upon the use to which the polymer is intended. The solution can be cast as a film or the solution of the polymer can be precipitated by pouring the solution into a quantity of a rapidly stirred nonsolvent.

The reaction between diketene and diamine appears to take place without any noticeable side reactions. Since the reaction is exothermic it may be performed at room temperature. The nature of the reaction is obviously such that it lends itself to a continuous process.

The polyamide-polyamines provided by this invention are valuable in certain photographic processes because they tend to be insoluble in alkaline solutions but are soluble in weak acid solutions. They are also useful as anti-static coatings on film and fabrics. They can be added to spinning solutions of cellulose acetate, polyacrylonitrile and other polymeric materials which can be spun to give fibers having improved dyeing properties. Other uses for the products of this invention have been disclosed above and are disclosed in connection with the examples presented below.

This invention can be further illustrated by the following examples of preferred embodiments although it will be understood that these examples are included merely for purposes of illustration and are not intended to limit the scope of the invention unless otherwise specifically indicated.

*Example 1*

To a solution of 5.8 g. (0.05 mole) of hexamethylene diamine in 50 ml. ethanol was added 4.2 g. (0.05 mole) of diketene dropwise. Rapid stirring was used and the reaction temperature was kept at 10–15° C. After the addition was complete (15 minutes), the reaction was stirred at 25° C. for 1 hour, then refluxed for 1 hour. The reaction solution was then divided into two parts and treated as follows:

(a) The first part was spread in a thin layer on a glass plate and the solvent allowed to evaporate. The residual polymer was a clear, light-colored, somewhat brittle film. It was insoluble in water and acetone; but was soluble in hot ethanol, dilute hydrochloric acid and dilute acetic acid. The polymer could be regenerated from the last two solvents by addition of alkali.

(b) The second half of the reaction solution was charged into a stainless steel, rocking autoclave; 1 g. of Raney nickel (the type of catalyst is not critical) was added, and the mixture was hydrogenated at 50° C. under 1500 p.s.i. hydrogen pressure. Upon cooling, the contents of the autoclave was filtered and the filtrate evaporated to give a polymeric film that had solubility properties similar to (a) above.

One part of the product described in (a) was dissolved in 50 parts of dimethylformamide and 9 parts of polyacrylonitrile was dissolved in the solution. Fibers spun from this dope dyed heavily with acid wool dyes, direct cotton dyes, cellulose acetate dyes, and premetallized dyes. These fibers possessed substantially the same excellent physical properties which characterize unmodified fibers.

The product described in (b) was dissolved in hot alcohol and an antihalation dye was added to the solution. The solution was coated on the back of a photographic film as an antihalation layer. The coating was removed from the film in the fixing bath because it is soluble in acid solutions. Similar results can be obtained using any of the known antihalation dyes.

The product described in (b) is valuable as an anti-static coating on films and textile fabrics. The alcohol solution was applied to a fabric made of polyethylene terephthalate fibers so that 2% of the polymer was deposited, based on the weight of the fabric. The alcohol was evaporated and the fabric was passed through a 0.5% aqueous solution of formaldehyde containing 0.1% ammonium phosphate. The fabric was then dried at 110° C. for 15 minutes. The treated fabric had a greatly reduced tendency to develop a static electricity charge.

*Example 2*

To a stirred solution of 19.9 g. (0.1 mole) of 4,4'-methylenebisaniline in 150 ml. of dimethylformamide was added slowly 8.4 g. (0.1 mole) of diketene. The addition was made at room temperature, and when completed the reaction was refluxed for one hour. After cooling, the polymer was separated as a precipitate having relatively small particle sizes by pouring the reaction mixture solution into 1000 ml. of water with rapid stirring. This material had a slight yellow color. It was insoluble in water and alcohol, but soluble in dimethylformamide.

One part of this product and 9 parts of polyacrylonitrile were dissolved in 50 parts of dimethylformamide and fibers were spun from the solution. The fibers dyed heavily with acid wool dyes, cellulose acetate dyes, direct cotton dyes, and premetallized dyes. Otherwise their properties were similar to unmodified fibers.

*Example 3*

A solution of 84 g. (1.0 mole) of diketene in 250 ml. of dioxane and a solution of 103 g. (1.0 mole) of diethylenetriamine in 250 ml. dioxane were added simultaneously to 200 ml. dioxane with rapid stirring. Reaction temperature was kept at 15–20° C. A mass of polymeric material was formed. After the addition was complete, the reaction mixture was heated on a steam bath for 30 minutes. Upon cooling, the dioxane was decanted and 400 ml. of water added. The polymer dissolved quite easily in the water.

This polymer could be made into a cross-linked, insoluble material by adding formalin in varying amounts to the aqueous polymer solution and evaporating to dryness. The degree of solubility and cross-linking is dependent upon the amount of formaldehyde provided by the formalin or other organic compound capable of yielding formaldehyde.

One part of the polymer, 0.08 part formaldehyde, and 0.02 part of ammonium chloride were dissolved in 50 parts of water and the solution was coated on a polyethylene terephthalate film to give a coating weight of 2–3%, based on the weight of the film. The film was then heated at 100–110° C. for 20 minutes. The film showed a markedly reduced tendency to develop static electricity charges. The value of this anti-static layer is analogous to that described in U.S. 2,725,297 but has the advantage of providing excellent results with a single material as contrasted to the usual practice of employing a multicomponent layer.

This polymer has a strong tendency to form coordination compounds with metals such as copper, zinc, nickel, chromium and cobalt. The copper compound can be made by adding copper acetate to the aqueous solution of the polymer and evaporating the water. The residue is then ground or pulverized. It is valuable as a constituent of antifouling marine paints because it slowly decomposes and liberates copper over an extended period of time. The copper compound also is valuable as a fungicide for use on plants.

*Example 4*

To a solution of 13.6 g. (0.1 mole) of m-xylene-$\alpha,\alpha'$-diamine in 300 cc. of dimethylformamide was added 8.4 g. (0.1 mole) of diketene. The temperature was kept at 10–15° C. during the addition. The reaction mixture was then heated at 120–140° C. for 1 hour.

The solution was coated on films of polystyrene, polyethylene terephthalate, and the condensation-type polyester made from terephthalic acid and 1,4-cyclohexanedimethanol (see Kibler et al. application Serial No. 554,639, filed December 22, 1955, now U.S. Patent No. 2,901,466, issued August 25, 1959). The solvent was then evaporated at an elevated temperature. The films showed a reduced tendency to develop static electrification.

*Example 5*

One molecular proportion of diketene and one molecular proportion of 1,3-cyclohexanebis(methylamine) were reacted in ethyl alcohol, as described in Example 1. The product was then hydrogenated in the alcohol solution, using Raney nickel catalyst as in Example 1. This polymer is valuable as an antihalation coating for photographic films. It was blended with an antihalation dye and applied to the film from the alcohol solution in a manner analogous to that described under Example 1(b) hereinabove. Since it is soluble in acid solutions, it dissolves off the film in the fixing bath.

As shown by the various examples, the polyamide-polyamines which are hydrogenated (recurring units as in Formula B) are more than mere equivalents of those polyamide-polyamines from which they were derived. The same applies to the cross-linked polyamide-polyamines. All three classes of polymers are distinct and separate in nature although they are related as is apparent from their preparation. However, none of these classes are related as simple homologs or isomers of each other.

The invention has been described in detail with particular reference to preferred embodiments thereof, but it will be understood that variations and modifications can be effected within the spirit and scope of the invention as described hereinabove and as defined in the appended claims.

We claim:

1. A film-forming highly polymeric linear polyamide-polyamine composed solely of regularly recurring units selected from the group consisting of units having the following two formulas:

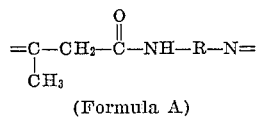

(Formula A)

and

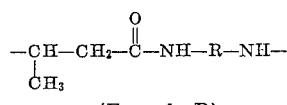

(Formula B)

where the ends of the polymer molecules have the terminal bonds on the terminal units satisfied by hydrogen atoms and R represents a radical selected from the group consisting of —(CH$_2$)$_2$—NH—(CH$_2$)$_2$— and a divalent organic hydrocarbon radical containing from 2 to 20 carbon atoms composed of hydrogen and carbon atoms arranged so as to include a sequence of carbon atoms from one end of the R radical to the other end, said sequence containing no interrupting radicals other than radicals selected from the group consisting of —O—, —S—, —SO$_2$—, —NH— and —N(CH$_3$)— radicals.

2. A polyamide-polyamine as defined by claim 1 wherein R is such that NH$_2$—R—NH$_2$ is a member selected from the group consisting of 1,6-hexamethylenediamine, p-xylene-α,α′-diamine, m-xylene-α,α′-diamine, 1,4-cyclohexanebis(methylamine), 1,3-cyclohexanebis(methylamine), 4,4′-methylenebisaniline and diethylenetriamine.

3. A polyamide-polyamine as defined by claim 2 wherein the repeating units have

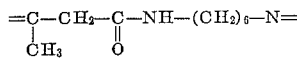

4. A polyamide-polyamine as defined by claim 2 wherein the repeating units have

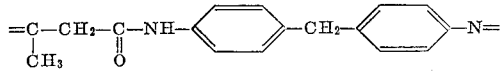

5. A polyamide-polyamine as defined by claim 2 wherein the repeating units have

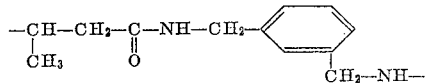

6. A polyamide-polyamine as defined by claim 2 wherein the repeating units have

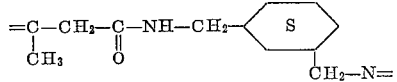

7. A polyamide-polyamine as defined by claim 2 wherein the repeating units have

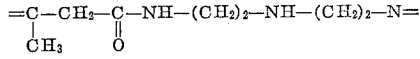

8. A cross-linked polyamide-polyamine essentially composed of polymeric molecules having recurring units as defined by claim 7, which polymeric molecules are cross-linked by reaction with formaldehyde at a temperature of at least about 100° C.

9. A process for preparing a film-forming highly polymeric linear polyamide-polyamine composed solely of recurring units having the following formula:

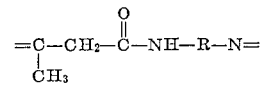

where the ends of the polymer molecules have the terminal bonds on the terminal units satisfied by hydrogen atoms and R represents a radical selected from the group consisting of —(CH$_2$)$_2$—NH—(CH$_2$)$_2$— and a divalent organic hydrocarbon radical containing from 2 to 20 carbon atoms, which comprises reacting at 0°–50° C. substantially equimolecular quantities of diketene and a diamine having the formula NH$_2$—R—NH$_2$ wherein R represents a radical selected from the group consisting of —(CH$_2$)$_2$—NH—(CH$_2$)$_2$— and a divalent organic hydrocarbon radical containing from 2 to 20 carbon atoms.

10. A process as defined by claim 9 conducted in the presence of an inert solvent for the diketene, the diamine and the resultant polyamide-polyamine.

11. A process as defined by claim 10 wherein the inert solvent is an organic compound containing from 1 to 15 carbon atoms selected from the group consisting of hydroxyalkoxyalkanes, dialkyl esters, alkanols, dihydroxyalkanes, dioxane, dimethylformamide, diethylformamide, chloroalkanes, bromoalkanes and iodoalkanes.

12. A process for preparing a film-forming highly polymeric linear polyamide-polyamine composed solely of recurring units having the following formula:

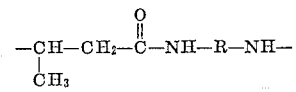

where the ends of the polymer molecules have the terminal bonds on the terminal units satisfied by hydrogen atoms and R represents a radical selected from the group consisting of —(CH$_2$)$_2$—NH—(CH$_2$)$_2$— and a divalent organic hydrocarbon radical containing from 2 to 20 carbon atoms composed of hydrogen and carbon atoms arranged so as to include a sequence of carbon atoms from one end of the R radical to the other end, said sequence containing no interrupting radicals other than radicals selected from the group consisting of —O—, —S—, —SO$_2$—, —NH— and —N(CH$_3$)— radicals, which comprises hydrogenating a polymer as defined by claim 1 having Formula A in a closed vessel under about 500 to 5000 p.s.i. of hydrogen in the presence of a hydrogenation catalyst at a temperature of about 20°–150° C.

13. A process as defined by claim 12 wherein the hydrogenation catalyst is selected from the group consisting of nickel, platinum and palladium hydrogenation catalysts.

14. A process as defined by claim 12 wherein the hydrogenation is conducted in the presence of an inert solvent which is an organic compound containing from 1 to 15 carbon atoms selected from the group consisting of hydroxyalkoxyalkanes, dialkyl ethers, alkanols, dihydroxyalkanes, dioxane, dimethylformamide, diethylformamide, chloroalkanes, bromoalkanes and iodoalkanes.

15. A process for preparing a cross-linked polyamide-polyamine comprising mixing (a) 100 parts by weight of the polyamide-polyamine defined by claim 7, (b) from at least a sufficient amount of water to dissolve said polyamide-polyamine up to 10,000 parts by weight of water, and (c) a member selected from the group consisting of formaldehyde and an organic compound which forms formaldehyde in contact with water in an amount sufficient to provide from 1 to 25 parts by weight of formaldehyde.

16. A process as defined by claim 15 wherein from 0.1 to 1 part by weight of ammonium chloride is present for each part by weight of formaldehyde which is provided.

References Cited in the file of this patent

UNITED STATES PATENTS

| | | |
|---|---|---|
| 2,130,523 | Carothers | Sept. 20, 1938 |
| 2,149,678 | Hovey et al. | Mar. 7, 1939 |
| 2,216,735 | Carothers | Oct. 8, 1940 |
| 2,284,896 | Hanford et al. | June 2, 1942 |
| 2,288,279 | Hopff et al. | June 30, 1942 |
| 2,303,928 | Frolich et al. | Dec. 1, 1942 |
| 2,533,455 | Hagemeyer | Dec. 12, 1950 |
| 2,976,148 | Walford | Mar. 21, 1961 |
| 2,982,651 | Mackey | May 2, 1961 |

OTHER REFERENCES

Fieser et al.: "Organic Chemistry," Third Edition, Reinhold Publishing Corp., New York, 1956, page 321 relied on.

Noller: "Chemistry of Organic Compounds," Second Edition, W. B. Saunders Co., Philadelphia, 1957, pp. 824–825 relied on.

Migrdichian: Organic Synthesis, vol. 2, page 951 (1957), published by Reinhold Publishing Corp., New York.